United States Patent
Ogawa et al.

(10) Patent No.: US 7,396,315 B2
(45) Date of Patent: Jul. 8, 2008

(54) VEHICLE CONTROL DEVICE

(75) Inventors: Hiroyuki Ogawa, Toyota (JP);
Yoshiharu Harada, Toyota (JP);
Atsushi Yuki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 83 days.

(21) Appl. No.: 11/229,535

(22) Filed: Sep. 20, 2005

(65) Prior Publication Data

US 2006/0111220 A1   May 25, 2006

(30) Foreign Application Priority Data

Nov. 19, 2004   (JP) ............... 2004-336120

(51) Int. Cl.
*B60W 10/06* (2006.01)
*B60W 10/10* (2006.01)
*B60W 10/18* (2006.01)

(52) U.S. Cl. ...................... 477/92; 477/188

(58) Field of Classification Search .......... 477/3, 477/4, 188, 197, 200, 92
See application file for complete search history.

(56) References Cited

U.S. PATENT DOCUMENTS

| | | | | |
|---|---|---|---|---|
| 5,391,127 A | * | 2/1995 | Nishimura | ............... 477/110 |
| 5,788,597 A | * | 8/1998 | Boll et al. | ............... 477/4 |
| 5,830,105 A | | 11/1998 | Iizuka | |
| 6,428,446 B1 | | 8/2002 | Ohtsuka | |
| 2002/0112489 A1 | * | 8/2002 | Egawa et al. | ............... 62/133 |
| 2003/0060330 A1 | * | 3/2003 | Sato et al. | ............... 477/174 |

FOREIGN PATENT DOCUMENTS

| | | |
|---|---|---|
| DE | 41 42 863 A1 | 4/1993 |
| DE | 196 41 608 A1 | 4/1997 |
| DE | 199 14 428 C1 | 11/2000 |
| EP | 0 842 836 A2 | 5/1998 |
| JP | 63-305798 | 12/1988 |
| JP | 06-001166 | 1/1994 |
| JP | 10-236290 | 9/1998 |
| JP | 11-289608 | 10/1999 |

* cited by examiner

*Primary Examiner*—Richard M. Lorence
*Assistant Examiner*—Edwin A Young
(74) *Attorney, Agent, or Firm*—Oblon, Spivak, McClelland, Maier & Neustadt, P.C.

(57) ABSTRACT

An ECT_ECU executes a program including the steps of: when the vehicle is coasting, increasing at a predetermined variation rate an electrical load attributed to an alternator; and if the transmission has downshifted, reducing the electrical load attributed to alternator.

10 Claims, 3 Drawing Sheets

VEHICLE CONTROL DEVICE

This nonprovisional application is based on Japanese Patent Application No. 2004-336120 filed with the Japan Patent Office on Nov. 19, 2004, the entire content of which is hereby incorporated by reference.

BACKGROUND OF THE INVENTION

1. Field of the Invention

The present invention relates generally to technology employed to brake vehicles, and particularly to that employing auxiliary equipment to increase engine brake to brake vehicles.

2. Description of the Background Art

An automatic transmission automatically shifting speed is conventionally known. When a vehicle having such an automatic transmission mounted thereon, and coasting with the accelerator off is decelerated, the transmission can downshift. If the transmission has downshifted, and the current speed is shifted, the engine thereafter has an increased rate of rotation, and engine brake contributes to increased braking force. This changes deceleration between before and after the current speed is changed, and the vehicle's occupant(s) may feel physical impact.

Japanese Patent Laying-open No. 10-236290 discloses a brake control device for vehicles that is capable of preventing shift shock in downshifting with power (or the accelerator) off. As described in the publication the brake control device controls a vehicle having an automatic transmission mounted on the vehicle and a brake device applying braking force to the vehicle. The brake control device includes a downshift predictor predicting whether the automatic transmission downshifts, a braking force application controller driven by information received from the downshift predictor to automatically apply braking force to the brake device after such prediction is made and thereafter the transmission has completely downshifted until a prescribed period of time elapses, and a limiter limiting an amount of braking force applied by the braking force application controller when the transmission is downshifting. When the downshift predictor predicts that the transmission downshifts, the controller incrementally applies braking force to increment deceleration and when the transmission starts to downshift the limiter simultaneously decrease an amount of braking force applied and when the transmission has completely downshifted, the interrupted application of braking force is resumed and decremented.

In the brake control device as described in the publication when a prediction is made that the automatic transmission downshifts, the braking force application controller applies braking force. When the transmission is actually downshifting the limiter limits braking force applied to a reduced amount. Thus, before the transmission starts to downshift, the vehicle is decelerated, and when the transmission downshifts, increased engine braking caused by a difference in rate of rotation attributed to a difference in gear ratio between before and after a gear is shifted, can be prevented, and between before and after the gear is shifted the vehicle can have a minimized difference in deceleration. This can provide significantly reduced shift shock caused by engine brake in downshifting and thus suitably prevent the vehicle's occupant(s) from feeling uncomfortable in downshifting.

As disclosed in the publication, however, after the transmission has completely downshifted the brake control device resumes to apply braking force as applied before the transmission starts to downshift, and decrements the braking force. As such, the engine braking increased by downshifting and the braking force applied by the braking force application controller cause a relatively large deceleration. Accordingly the vehicle's occupant(s) feels/feel physical impact, and furthermore, as the completion of the downshift is followed by decrementing an amount of braking force applied, despite the downshift, reduced braking force is provided, and after the downshift when a prediction is made that the transmission again downshifts, incremented deceleration is provided, so that despite the same transmission gear, deceleration is increased and decreased and the occupant(s) may feel uncomfortable.

SUMMARY OF THE INVENTION

The present invention contemplates a vehicle control device that can minimize physical impact experienced by the vehicle's occupant(s) and also decelerate the vehicle while preventing the occupant(s) from feeling uncomfortable. The present invention also contemplates a vehicle control device providing reduced energy loss.

The present invention in one aspect provides a vehicle control device controlling a vehicle including a drive source and a transmission linked to the drive source. The present vehicle control device includes: an applier applying braking force to the vehicle; an acceleration pedal position detector detecting an acceleration pedal position; a downshift detector detecting whether the transmission has completely downshifted; and a controller controlling the applier to apply the braking force for the acceleration pedal position smaller than a predetermined position in angle, and reduce the braking force when the transmission has completely downshifted.

In accordance with the present invention when an accelerator pedal position is smaller than a predetermined position in angle and the vehicle is coasting, and the transmission also downshifts, then after the transmission has completely downshifted, braking force is reduced. Thus by the reduced braking force a difference in braking force between the downshift is reduced. This can reduce physical impact attributed to downshifting. Furthermore if an accelerator pedal position is smaller than the predetermined position in angle the vehicle is coasting the braking force applied by the applier is not reduced at a timing other than that of downshifting. This can prevent deceleration from increasing and decreasing for the same gear. The vehicle can thus be decelerated while the vehicle's occupant(s) do(es) not feel uncomfortable. The present vehicle control device can thus reduce physical impact experienced by the occupant(s) and also decelerate the vehicle without causing the occupant(s) to feel uncomfortable.

Preferably when the acceleration pedal position detector detects that the acceleration pedal position is smaller than the predetermined position in angle the controller controls the applier to increase the braking force at a predetermined variation rate.

In accordance with the present invention for an accelerator pedal position smaller than the predetermined position in angle the applier applies braking force increased at a predetermined variation rate. Thus the vehicle can gradually be decelerated and thus prevented from rapidly decelerating.

Still preferably the applier is a power generator.

In accordance with the present invention a power generator can generate power while the power generator's load can be increased and decreased to adjust the vehicle's braking force. Thus, braking force can be applied while kinetic energy can be recovered effectively as an electrical energy. The present vehicle control device can thus reduce energy loss.

Still preferably the applier is a compressor of an air conditioner of the vehicle.

In accordance with the present invention a compressor can apply pressure to a coolant in an amount increased and decreased or be rotated at a rate of rotation increased and decreased to adjust the vehicle's braking force.

Still preferably the drive source is an internal combustion engine and the applier is a throttle valve adjusting an amount of air aspirated into the internal combustion engine.

In accordance with the present invention a throttle valve can have its angle increased and decreased to open and close to increase and decrease pumping loss and adjust the vehicle's braking force.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
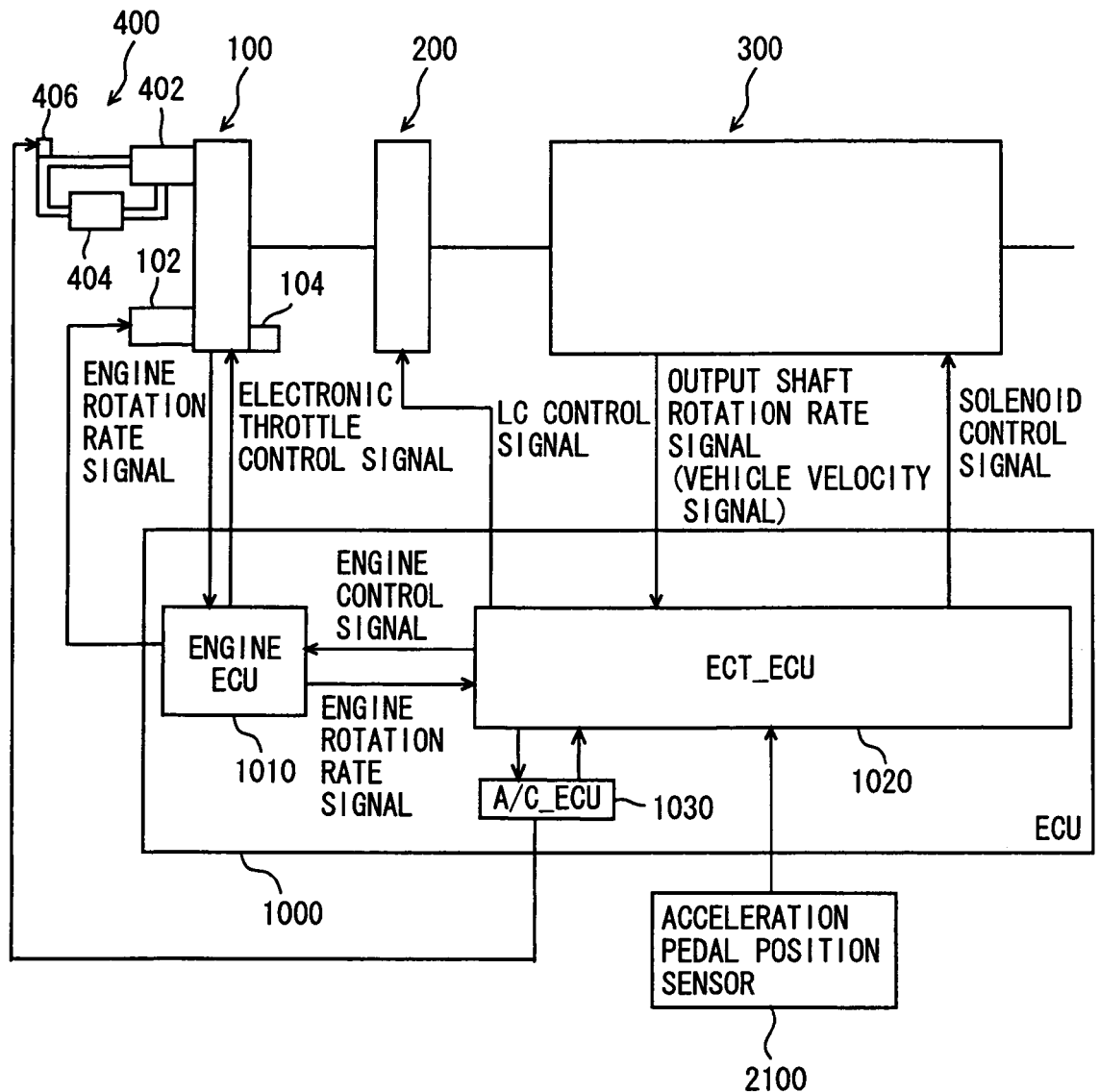
FIG. 1 is a block diagram for illustrating controlling a vehicle including the present vehicle control device in an embodiment.

Hereinafter reference will be made to the drawings to describe the present invention in an embodiment. In the following description, identical components are dented by identical reference characters. They are also identical in function and name.

Reference will initially be made to FIG. 1 to describe a powertrain of a vehicle including a control device of the present embodiment. The present embodiment provides a vehicle control device implemented by a program executed by an electronic control unit (ECU) 1000 shown in FIG. 1. In the present embodiment an automatic transmission will be described as that having a gear transmission mechanism including a fluid coupling implemented by a torque converter. Note that the present invention is not limited to that having a gear transmission mechanism. It may be a continuously variable transmission employing a belt. Furthermore the gear transmission mechanism may be configured of a planetary gear or may be a constantly engaged gear.

As shown in FIG. 1, this vehicle's powertrain includes an engine 100, a torque converter 200, an automatic transmission 300, and an ECU 1000.

The engine 100 output shaft is connected to the torque converter 200 input shaft. Engine 100 and torque converter 200 are linked by a shaft of rotation. As such, a rate of rotation NE of the output shaft of engine 100 detected by a sensor provided to detect the engine's rate of rotation is equal to that of rotation or the input shaft of torque converter 200 (or a pump).

Torque converter 200 is composed of a lockup clutch directly connecting the input and output shafts, a pump impeller associated with the input shaft, a turbine runner associated with the output shaft, and a stator having a one-way clutch and functioning to amplify torque. Torque converter 200 and automatic transmission 300 are connected by a shaft of rotation. Torque converter 200 has an output shaft rotating at a rate NT (or the turbine rotates at rate NT), which is detected by a sensor provided to detect the turbine's rate of rotation. Automatic transmission 300 has an output shaft rotating at a rate NOUT, which is detected by a sensor provided to detect the output shaft's rate of rotation.

Such automatic transmission 300 includes therein a plurality of frictional components including a clutch, a brake and the like. In accordance with a predetermined operation table a hydraulic circuit is controlled so that the frictional component or a clutching element (e.g., clutches C1-C4), a braking element (e.g., brakes B1-B4), a one-way clutching element (e.g., one-way clutches F0-F3), and the like are engaged and disengaged to correspond to each gear as required. Automatic transmission 300 has shift positions including a parking position (P), a reverse position (R), a neutral position (N), and a forward drive position (D).

The powertrain is controlled by ECU 1000 including an engine ECU 1010 controlling engine 100, an ECT_ECU 1020 controlling automatic transmission 300, and A/C_ECU 1030 controlling an air conditioner 400.

ECT_ECU 1020 receives a signal representing the output shaft's rate of rotation NOUT detected by the output shaft rotation rate sensor. ECT_ECU 1020 also receives from engine ECU 1010 the engine's rotation rate signal representing the engine's rate of rotation NE detected by the engine rotation rate sensor.

These rotation rate sensors are arranged opposite a tooth of a gear attached to the torque converter 200 input and output shafts and the automatic transmission 300 output shaft for detection of rotation. These sensors are capable of detecting slightest rotation of the torque converter 200 input and output shafts and the automatic transmission 300 output shaft and typically are sensors employing a magneto-resistive element referred to as a semiconductor sensor.

Furthermore ECT_ECU 1020 outputs an engine control signal (e.g., a throttle angle signal) to engine ECU 1010, and in response to the engine control signal and/or other control signal engine ECU 1010 controls engine 100 and an alternator 102. Engine ECU 1010 controls engine 100 for example by controlling an electronic throttle (valve)'s angle, a timing of spark, and the like.

ECT_ECU 1020 outputs a signal applied to control the ECT_ECU 200 lockup clutch. In response to this signal the lockup clutch's engagement pressure is controlled. Furthermore, ECT_ECU 1020 outputs a solenoid control signal to automatic transmission 300. In response to this signal, a linear solenoid valve, an on/off solenoid valve and the like of hydraulic circuit of automatic transmission 300 are controlled to control the frictional components to be engaged and disengaged to shift gears as prescribed (e.g., first-fifth gears).

ECT_ECU 1020 also receives from an acceleration pedal position sensor 2100 a signal representing the acceleration pedal's position as operated by the vehicle's driver. Furthermore ECU 1000 has a memory having a variety of data, programs and the like stored therein.

A/C_ECU 1030 operates in response to the vehicle's occupant(s)' operation to control air conditioner 400 so that the vehicle's cabin attains a desired temperature. Air conditioner 400 includes a compressor 402, an evaporator 404, and a relief valve 406. Compressor 402 is linked to the engine 100 crankshaft by a belt.

Compressor 402 pressurizes a coolant which is sent to evaporator 404 and therein evaporates and thus deprives air of heat. This air is used for the cabin's internal air-conditioning. Compressor 402 applies pressure in an amount as adjusted by relief valve 406, as controlled by A/C_ECU 1030.

Figure 2:
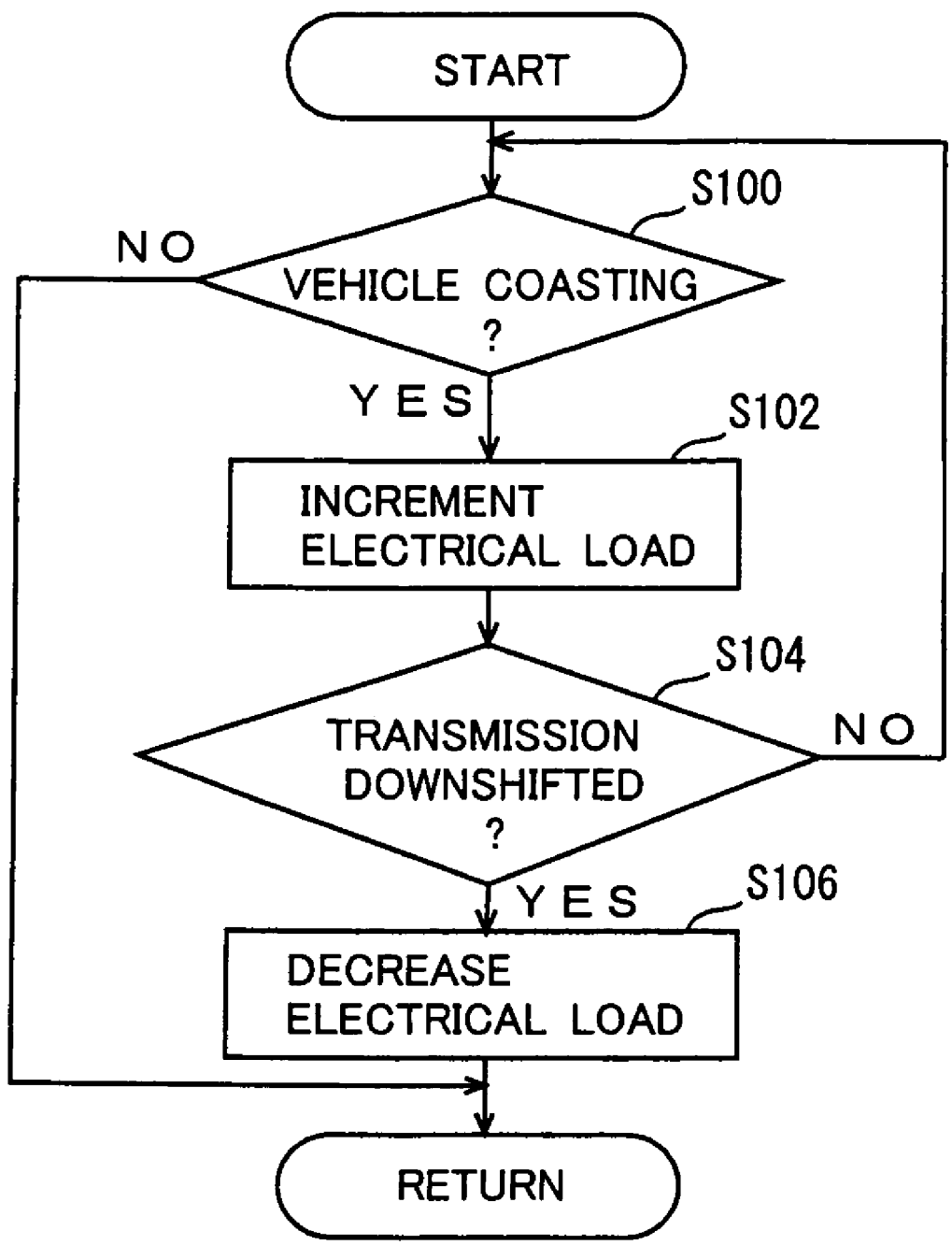
FIG. 2 is a flowchart of a structure of a program for control that is executed by an ECU corresponding to.the present vehicle control device in an embodiment.

Reference will be made to FIG. 2 to describe a structure of a program for control that is executed by ECT_ECU 1020 of ECU 1000 implementing the control device in the present embodiment.

At step (S) 100 ECT_ECU 1020 operates in response to a signal received from acceleration pedal position sensor 2100 to determine whether the vehicle is coasting. For example for an acceleration pedal position of 0, which corresponds to an acceleration pedal position smaller than a predetermined angle, ECT_ECU 1020 determines that the vehicle is coasting. If the vehicle is coasting (yes at S100) the process proceeds to S102. Otherwise (no at S100) this process ends.

At S102 ECT_ECU 1020 transmits a control signal to engine ECU 1010 to increase at a predetermined variation rate (or increment) an electrical load attributed to alternator 102. Instead of increasing the electrical load attributed to alternator 102, the compressor 402 may be rotated at an increased rate of rotation or apply an increased amount of pressure. Furthermore, electronic throttle 104 may be opened at a reduced angle to provide increased pumping loss or a load attributed to another auxiliary equipment may be increased. In particular, if the alternator 102 load is increased, alternator 102 can generate an increased amount of power and kinetic energy can effectively be recovered as electrical energy to contribute to reduced energy loss.

At S104 ECT_ECU 1020 determines whether the transmission is (and has completely) downshifted. Note that since ECT_ECU 1020 itself determines whether the transmission should downshift, whether the transmission has downshifted or not is determined internal to ECT_ECU 1020. If the transmission is (and has completely) downshifted (yes at S104) the process proceeds to step S106. Otherwise (no at S104) the process returns to S100.

At S106 ECT_ECU 1020 transmits a control signal to engine ECU 1010 to reduce the electrical load attributed to alternator 102. In the present embodiment the electrical load attributed to alternator 102 is set to zero. Thereafter the process ends.

Note that the electrical load attributed to alternator 102 may be reduced by a predetermined amount. Instead of decreasing the electrical load attributed to alternator 102, the compressor 402 may be rotated at a reduced rate of rotation or apply a reduced amount of pressure. Furthermore, electronic throttle 104 may be opened at an increased angle to provide reduced pumping loss or a load attributed to another auxiliary equipment may be reduced.

In accordance with the structure and flowchart as described above ECT_ECU 1020 of the control device of the present embodiment operates, as described hereinafter.

When an acceleration pedal position of zero is attained (or the accelerator is turned off) and the vehicle coasts (yes at S100) the electrical load attributed to alternator 102 is increased at a predetermined variation rate (S102).

Figure 3:
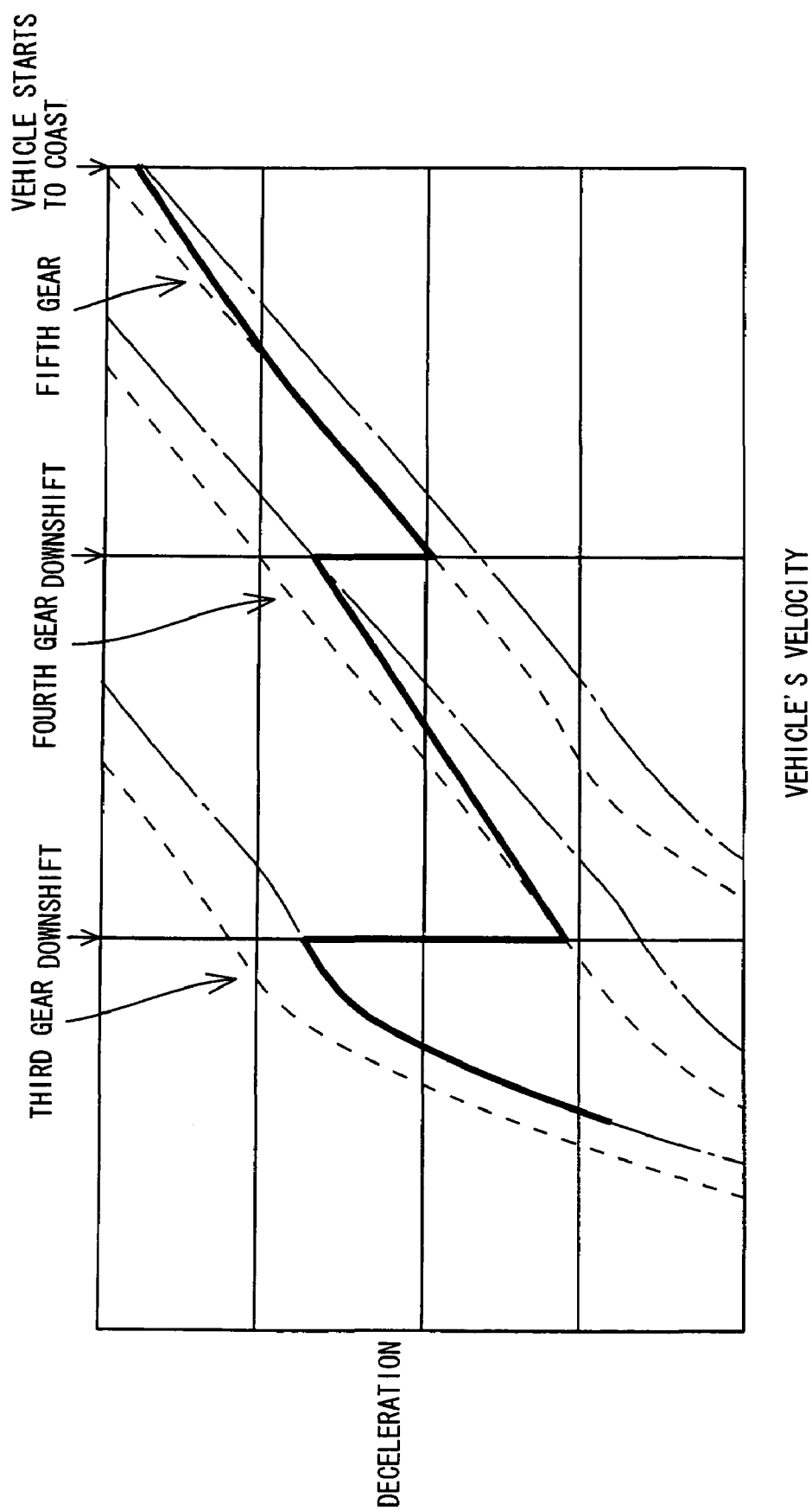
FIG. 3 is timing plots representing how deceleration transitions.

This gradually increases deceleration, as shown in FIG. 3, as compared with a condition with no electrical load, as indicated in the figure by a chained line. Note that in the figure, a broken line indicates deceleration provided for maximum electrical load.

In this condition as the vehicle decelerates the transmission downshifts for example from fifth to fourth and when the transmission has completely downshifted (yes at S104) the electrical load attributed to alternator 102 is set to zero (S106). Thus a difference in deceleration between before and after the downshift can be reduced by the electrical load so as to reduce physical impact in downshifting.

Furthermore if the vehicle is coasting the electrical load attributed to alternator 102 is not reduced at a timing other than that of downshifting. This can prevent deceleration from increasing and decreasing for the same gear. The vehicle can thus be decelerated while the vehicle's occupant(s) do(es) not feel uncomfortable.

Furthermore a braking device (not shown) such as a disk brake provided at a wheel is not used to applying braking force. Even if the vehicle coasts for a long period of time the brake device is not degraded by heat caused by friction. Furthermore, increasing the electrical load attributed to alternator 102 allows an increased amount of power to be generated, and the vehicle's kinetic energy can be converted to electrical energy and effectively used.

Thus the present embodiment provides a control device having an ECU increasing at a predetermined variation rate an electrical load attributed to an alternator when the vehicle is coasting. With the vehicle coasting when the transmission is and has completely downshifted the electrical load attributed to the alternator is reduced. A difference in deceleration between before and after the downshift can thus be reduced by the electrical load so as to reduce physical impact in downshifting. Furthermore if the vehicle is coasting the electrical load attributed to the alternator is not reduced at a timing other than that of downshifting. This can prevent deceleration from increasing and decreasing for the same gear. The vehicle can thus be decelerated while the vehicle's occupant(s) do(es) not feel uncomfortable.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control device for a vehicle, including a drive source and a transmission linked to said drive source, said control device comprising:

an applier that applies braking force to said vehicle;

an acceleration pedal position detector that detects an acceleration pedal position;

a downshift detector that detects whether downshifting said transmission from a first gear ratio to a second gear ratio has completed; and a controller that causes said applier to apply said braking force when said acceleration pedal position is smaller than a predetermined angular position, and causes said applier to reduce said braking force when downshifting said transmission from a first gear ratio to a second gear ratio has completed if said transmission downshifts from said first gear ratio to said second gear ratio while said braking force is applied.

2. The control device according to claim 1, wherein when said acceleration pedal position detector detects that said acceleration pedal position is smaller than said predetermined angular position, said controller causes said applier to increase said braking force at a predetermined variation rate.

3. The control device according to claim 1 or 2, wherein said applier is a power generator.

4. The control device according to claim 1 or 2, wherein said applier is a compressor of an air conditioner of said vehicle.

5. The control device according to claim 1 or 2, wherein:
said drive source is an internal combustion engine; and
said applier is a throttle valve adjusting an amount of air aspirated into said internal combustion engine.

6. A control device for a vehicle, including a drive source and a transmission linked to said drive source, said control device comprising:

means for applying braking force to said vehicle;

means for detecting an acceleration pedal position;

means for detecting whether downshifting said transmission from a first gear ratio to a second gear ratio has completed; and means for controlling said means for applying, the means for controlling causing the means for applying to apply said braking force when said acceleration pedal position is smaller than a predetermined angular position, and causes said means for applying to reduce said braking force when downshifting said transmission from a first gear ratio to a second gear ratio has completed if said transmission downshifts from said first gear ratio to said second gear ratio while said braking force is applied.

7. The control device according to claim 6, wherein said means for controlling includes means for controlling that cause said means for applying to increase said braking force at a predetermined variation rate when said means for detecting said acceleration pedal position detects that said acceleration pedal position is smaller than said predetermined angular position.

8. The control device according to claim 6 or 7, wherein said means for applying is a power generator.

9. The control device according to claim 6 or 7, wherein said means for applying is a compressor of an air conditioner of said vehicle.

10. The control device according to claim 6 or 7, wherein:

said drive source is an internal combustion engine; and said means for applying is a throttle valve adjusting an amount of air aspirated into said internal combustion engine.

* * * * *